United States Patent Office 2,773,787
Patented Dec. 11, 1956

2,773,787

PRODUCTION OF GROUP IV–A METALS

Christian E. Rick, Wilmington, Del., assignor to E. I. du Pont de Nemours and Company, Wilmington, Del., a corporation of Delaware No Drawing. Application December 20, 1952,
Serial No. 327,159

5 Claims. (Cl. 148—13.1)

This invention relates to the production of metals from group IV–A of the periodic table, and more particularly to novel methods for purifying such metals. More specifically it relates to the production of pure titanium metal and the removal of undesired contaminating impurities therefrom.

It is well known that the presence of relatively small amounts of such impurities as oxygen and nitrogen in titanium and other group IV–A metals severely and adversely affects their physical properties. To avoid these adverse effects, the utmost care is exercised in such metal production to prevent entrance of air, oxides, equipment scale, or other carriers of these impurities into the reaction vessel or purification equipment employed in such production. Disadvantageously, this procedure seriously limits available methods and rates of production and adds greatly to the cost of the product metal. Because of the lack of suitable purification means to remove these impurities, oxide reduction processes for such production, such as the calcium reduction of titanium dioxide, are non-competitive with present titanium halide ($TiCl_4$) reduction processes because of the small amount of oxygen (usually less than 1%) which remains in the product metal.

It is among the objects of this invention to overcome these and other disadvantages characterizing prior group IV–A metal producing processes and to provide novel and effective methods for attaining such objects. It is among the particular objects of this invention to provide novel procedures for removing small amounts of oxygen, nitrogen, and other undesired impurities from group IV–A metals, especially from titanium. Another particular object is to provide a novel process for removing residual oxygen from a titanium metal product resulting from various reduction processes and especially from one utilizing a metal oxide of titanium as a starting material. Other objects and advantages of the invention will be apparent from the ensuing description of my invention.

These and other objects are realized in this invention which comprises heating an impurity-contaminated group IV–A metal product with a solid elemental metal which forms an oxide or nitride compound having a higher volatility than its metal component, employing an amount of said solid elemental metal substantially the chemical equivalent of the impurity present in said group IV–A metal, continuing said heating until formation of said compound of higher volatility is effected, and thereafter recovering the purified group IV–A metal thus obtained.

In a more specific embodiment, the invention comprises removing oxygen and/or nitrogen contaminants from a group IV–A metal, particularly titanium, zirconium, or hafnium, by heating said metal to temperatures ranging from about 500–1800° C. and preferably to at least 1000° C. in the presence of a solid elemental metal treating agent selected from the group consisting of germanium, gallium, and indium, utilizing in the treatment an amount of said elemental metal substantially the chemical equivalent of the oxygen or nitrogen contaminant present in said group IV–A metal, continuing the heating treatment until said contaminants volatilize as a compound of the solid metal treating agent used, and separately recovering the purified group IV–A metal and volatilized treating agent compound which results.

In practically adapting the invention to decontaminate a group IV–A metal including titanium, zirconium and hafnium, and especially those containing a combined oxygen and nitrogen content of, say, less than 1%, such as are obtained from any reduction process or scrap source, the solid elemental agent adapted to effect removal of the contaminating oxygen and/or nitrogen is suitably admixed or associated therewith and the mixture is then heated in a conventional type of closed reactor or other form of heating vessel. Thus, impure metal products contemplated for treatment include those obtained by reduction of an oxide of the group IV–A metal with a reducing metal such as calcium; from conventional electrolytic reduction processes; calcium hydride reductions, or reducing gases; by reduction of a group IV–A metal halide such as the chloride, with a reducing metal such as magnesium or an alkali (sodium, potassium, etc.) or alkaline earth metal (calcium, barium, etc.); and from any metal reduction, recovery or treating process. Also contemplated for treatment herein are titanium metal or high-titanium-content alloy products containing small amounts of residual reducing agent, such as aluminum and some iron, and such as result from the use of natural rutile as a raw material source but which, to be useful for commercial adaptation, still require low oxygen and nitrogen contents. These products contain some residual oxygen and/or nitrogen from the reduction process and can be advantageously improved by the present invention. Specific types of metal products adapted to be treated herein include those resulting from the reduction procedures disclosed in U. S. Patents 1,373,038, 2,205,854, 1,602,542, 2,564,337, 2,618,549, etc.

The mixture of metal, preferably titanium, and germanium, gallium, or indium treating agent (the latter in an amount chemically equivalent to an amount of contaminants to be removed from such metal) is then heated to from 500–1800° C. and preferably to at least 1000° C. within the reactor or furnacing means, with such heating being continued until volatilized compounds of the treating agent with such contaminants are formed and removed from the metal. The volatile compounds evolved in the process can be immediately removed from the reactor for condensation and separate recovery, or, if desired, can be condensed upon the cooler wall portions of the reactor and subsequently recovered when removal of the purified metal from the reactor vessel is being undertaken.

To a clearer understanding of the invention, the following example is given in which parts given are by weight. This example is merely illustrative and not in limitation of my invention.

*Example*

To 100 parts of granular sponge titanium metal produced by the method described in U. S. Patent 2,205,854, analyzing to the following composition: titanium 99.5%, carbon .13%, oxygen .12%, nitrogen .05%, and tested to have a Vicker hardness number of 256 on an arc melted sample button, was added .93 part of germanium metal powder. Of this .93 part, .54 part is to be utilized to form volatile GeO from the oxygen content of the titanium metal and .39 part of the germanium is to be utilized to form $Ge_3N_2$ from the nitrogen content of the titanium. The germanium and titanium metals are intimately mixed and placed in a water-cooled crucible cup of an arc furnace similar to that illustrated in an article "Production of ductile titanium," by W. Kroll, in the Transactions of the Electrochemical Society, vol. 78, p. 43, 1940. The upper surface of the metal is melted and the button is then turned over and the lower surface melted as described in said article. After the melting operation, the button is allowed to cool and the furnace disassembled. About 0.8 part of a solid material representing the germanium oxygen and nitrogen compounds volatilized from the titanium metal-germanium mixture during the heating operation is scraped off and removed from the colder portion of the arc furnace. The recovered, treated metal button tests 162 for Vicker hardness number. This decrease in Vickers hardness number represents a considerable increase in and enhancement of the useful properties of the decontaminated metal.

The heating means resorted to in the invention can comprise any suitable induction melting process, including that outlined in the article, "Casting and forging of titanium," by J. B. Sutton, E. A. Gee, and W. D. De Long, in the November 1950 Metal Progress; or, if desired, recourse can be had to arc melting furnaces of the type shown in the articles, "Production of ductile titanium," by W. Kroll in the Transactions of Electrochemical Society, vol. 78, p. 43, 1940, "Arc melting of titanium metal," by S. F. Radtke, R. M. Scriver, and J. A. Snyder in the Transactions, A. I. M. E., Journal of Metals, pp. 620–624, August 1951, and other vacuum furnaces such as shown in "Preparation of high melting alloys with the aid of electron bombardment," R. Huetgren and M. H. Pakkala, J. Applied Physics, vol. 11, No. 10, pp. 643–646, October 1940, and United States Patent 997,883 by E. Weintraub.

The removal of the volatile compounds of the treating agents will be more desirably rapid as the driving force for vaporization is increased, that is, by employment of relatively high temperatures, high vacuum of rapid inert gas purging. This means that the greatest efficiency can be achieved with the metals being treated in the molten state but advantageously improved effects can be achieved by recourse to surface treatment with the elemental agent with heating below the melting point of the group IV-A metal but above the vaporization temperature of the volatile oxygen and nitrogen compounds of the treating agent. This lower temperature treatment will achieve results, also depending upon the length of time the treatment is continued, because diffusional forces must be allowed to act, the entrance of treating agent into the metal, the vaporization of the volatile compounds, and then the migration of oxygen and nitrogen to the lowered concentration of the surface zone. In some cases where the contamination is essentially only on the surface, this lower temperature method will achieve the desired removal efficiently. In the lower temperature treatments other furnacing means such as vacuum or inert atmosphere furnaces using an electrical resistor furnace, induction heating, or enclosed shell type furnaces heated by conventional means are also suitable.

The solid elemental agents adapted for use herein to effect removal of the contaminating oxygen and/or nitrogen possess the following favorable characteristics: (1) a melting point below that of metallic titanium, (2) a relatively high boiling point, and (3) their oxide and nitride compounds have low vaporization or sublimation temperatures. Examples thereof comprise gallium, having a melting point of 30° C. and a boiling point of about 2000° C., the oxide, $Ga_2O$, of which sublimes around 500° C. and its nitride, GaN, sublimes at about 800° C.; germanium, having a melting point of 959° C., a boiling point of around 2700° C., and the oxide, GeO, of which sublimes at about 710° C. with its nitride, $Ge_3N_2$, subliming at about 650° C., and indium metal which melts at 155° C., has a boiling point of about 2100° C., and the volatile oxide, $In_2O$, of which sublimes at around 700° C.

The volatile oxide and/or nitride compounds of the treating agent are removed from the metal by heating and volatilization. The heating zone preferably should be evacuated or swept with a flow of inert (argon, helium, etc.) gas to assist in the removal of these compounds. The compounds can be condensed and collected by well-known means in a section of the heating equipment or in associated equipment. Care must be taken to prevent leakage or entrance of any contaminating oxygen and nitrogen into the apparatus while the metal under treatment is hot.

My invention can be more exactly and advantageously practiced if an analysis of the metal to be treated is available or made prior to the treatment, thereby making the addition of the treating agent in amounts exactly calculable by chemical stoichiometry. Improvements of less exact nature can be obtained if the rough composition and some physical testing data on the metal are known. Thus, one can approximate the contaminating gas-type impurity content by developing such relations as given in the article by Jaffee, Ogden and Maykuth, "Alloys of titanium with carbon, oxygen and nitrogen," in Transactions A. I. M. E., vol. 188, October 1950, Journal of Metals, pages 1261–66.

Although some of my novel treating agents are relatively expensive for use, it is apparent that in the operation of the invention full recognition of the value of the material vaporized from the metal will be realized and suitable recovery techniques can be advantageously utilized. Well-known chemical methods can then be employed to reduce the oxide and/or nitride compounds of these treating agents back to the pure element for recycling and reuse in further purification operations.

The utility of my invention is readily apparent because the value of the metal is increased by the removal of the oxygen and/or nitrogen impurities.

I claim as my invention:

1. A method for purifying titanium metal containing not more than 1% of combined oxygen and nitrogen impurities comprising mixing with said titanium elemental germanium in an amount chemically equivalent to said impurities, heating the resulting mixture to a temperature between about 1000° C. and 1800° C. under an inert atmosphere to form volatilized germanium oxide and nitride, and separately recovering the purified titanium and said volatilized germanium compounds.

2. A method for purifying titanium metal containing not more than 1% of combined oxygen and nitrogen impurities comprising mixing with said titanium elemental gallium in an amount chemically equivalent to said impurities, heating the resulting mixture to a temperature between about 1000° C. and 1800° C. under an inert atmosphere to form volatilized gallium oxide and nitride, and separately recovering the purified titanium and said volatilized gallium compounds.

3. A method for purifying titanium metal containing not more than 1% of combined oxygen and nitrogen impurities comprising mixing with said titanium elemental indium in an amount chemically equivalent to said impurity, heating the resulting mixture to a temperature between about 1000° C. and 1800° C. under an inert atmosphere to form volatilized indium oxide, and separately recovering the purified titanium and said volatilized indium oxide.

4. A method for removing combined oxygen and nitrogen impurity contaminants from a metal product selected from the group consisting of titanium, zirconium and hafnium which comprises heating said product to temperatures ranging from about 500–1800° C. under an inert atmosphere with an amount of a solid elemental metal-treating agent selected from the group consisting of germanium, gallium and indium substantially the chemical equivalent of said contaminants and until the latter volatilizes as compounds of said treating agent, effecting said heating in a closed reaction zone and at a temperature at least equal to the volatilization temperature of said compound but below the boiling point of said treating agent, and separating and recovering the resulting purified, treated metal product from said volatilized contaminant compounds.

5. A method for purifying a titanium metal product containing not more than about 1% of combined oxygen and nitrogen impurities, comprising mixing said metal product with a solid elemental treating agent selected from the group consisting of germanium, gallium and indium, with the amount of said treating agent being substantially the chemical equivalent of the amount of said impurities present in said metal product, heating the resulting mixture in an inert atmosphere within a closed reaction zone until said impurities volatilize as compounds of said treating agent, maintaining the temperature in said reaction zone at least equal to the volatilization temperature of said compound but below the boiling point of said treating agent, and separately recovering the purified titanium metal and resulting treating agent compounds.

References Cited in the file of this patent

UNITED STATES PATENTS

| 1,602,542 | Marden | Oct. 12, 1926 |
| 2,546,320 | Rostron | Mar. 27, 1951 |

FOREIGN PATENTS

| 354,785 | Great Britain | Aug. 10, 1931 |
| 1,814 | Australia | Oct. 9, 1931 |

OTHER REFERENCES

Mining and Metallurgy, May 1946, pages 262–266.

Gmelins Handbuch Der Anorganishen Chemie (8th Ed.), "System Nr. 41, Titan," Pub. 1951, page 202.

Metal Progress, vol. 55, March 1949, pages 359–361.